United States Patent
Thompson

(10) Patent No.: US 6,843,306 B2
(45) Date of Patent: Jan. 18, 2005

(54) COMPACT DUCTLESS COOLING WITH HEAT EXCHANGERS

(75) Inventor: Paul S. Thompson, Santee, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 09/122,900

(22) Filed: Jul. 27, 1998

(65) Prior Publication Data

US 2002/0012375 A1 Jan. 31, 2002

(51) Int. Cl.[7] .............................. F28F 7/00; H05K 7/20
(52) U.S. Cl. ............................... 165/80.3; 165/104.33; 165/104.34; 257/721; 361/697
(58) Field of Search .................. 165/80.3, 104.33, 165/104.34, 108; 257/721, 722; 361/697

(56) References Cited

U.S. PATENT DOCUMENTS

| | | | | |
|---|---|---|---|---|
| 1,905,811 A | * | 4/1933 | Culver | 165/104.34 X |
| 3,173,477 A | * | 3/1965 | Cuzzone | 165/104.34 X |
| 3,387,648 A | * | 6/1968 | Ward, Jr. et al. | 165/104.34 |
| 3,749,981 A | * | 7/1973 | Koltuninc et al. | 165/104.34 |
| 4,139,057 A | * | 2/1979 | Klaar | 165/104.34 |
| 4,739,823 A | * | 4/1988 | Howard | 165/104.34 X |
| 4,959,840 A | | 9/1990 | Akins et al. | |
| 5,183,104 A | * | 2/1993 | Novotny | 165/104.34 X |
| 5,377,215 A | | 12/1994 | Das et al. | |
| 5,748,656 A | | 5/1998 | Watson et al. | |
| 5,950,712 A | * | 9/1999 | Gates et al. | 165/104.34 X |
| 6,026,891 A | * | 2/2000 | Fujiyoshi et al. | 165/104.34 X |
| 6,034,873 A | * | 3/2000 | Stahl et al. | 165/80.3 |
| 6,123,145 A | * | 9/2000 | Glezer et al. | 165/104.33 |

FOREIGN PATENT DOCUMENTS

| | | | | |
|---|---|---|---|---|
| DE | 2622470 | * | 12/1977 | 165/104.34 |
| DE | 3717540 | * | 12/1988 | 165/104.34 |
| FR | 1041847 | * | 10/1953 | 165/104.34 |
| FR | 2493667 | * | 5/1982 | 165/104.34 |
| JP | 00908298 | * | 4/1989 | 165/104.34 |
| SU | 0750767 | * | 7/1980 | 165/104.34 |

OTHER PUBLICATIONS

IBM Technical Disclosure Bulletin, vol. 28 No. 7 Dec. 1985, pp. 3223–3224.*
EG&G Wakefield Engineering, Components Division, 60 Audobon Road, Wakefield, MA 01880, Heat Exchanger, Application Guide, p. 18 (date of publication unknown).

* cited by examiner

Primary Examiner—Ljiljana Ciric
(74) Attorney, Agent, or Firm—William C. Cray; Cymer, Inc.

(57) ABSTRACT

Heat is removed from an equipment enclosure using a recirculating air flow loop that is confined entirely within the enclosure. A segment of the air flow loop is directed onto heat-generating components, contained within housings mounted inside the enclosure. A segment of the air flow loop carries heated air to a heat exchanger, which transfers heat to flowing liquid. A portion of the air flow loop traverses through the ductless air volume confined between the housings and inner walls of the enclosure. Blowers to drive the air flow are typically mounted within or on a housing. Heat exchangers are also typically mounted on a housing. Embodiments of the present invention enable a single heat exchanger or multiple heat exchangers to cool multiple electronic components without complicated ducting and without exhausting heated air into a controlled manufacturing environment, e.g. a clean room.

18 Claims, 3 Drawing Sheets

COMPACT DUCTLESS COOLING WITH HEAT EXCHANGERS

FIELD OF THE INVENTION

The present invention relates to heat exchangers and methods of heat transfer, and particularly relates to ductless cooling with heat exchangers in conjunction with lasers and electrical power equipment.

BACKGROUND

Lasers and other electronic equipment generate waste heat during operation. At higher power levels typically required for industrial operation, removal of this waste heat is important to avoid temperature increases that could otherwise degrade the performance of the electronic equipment and related apparatus. A conventional method for disposing of waste heat is to blow ambient air over the heat-generating components and to exhaust the heated air through a room air conditioning system. In some controlled environments, e.g. clean room facilities for microelectronic circuit processing, it is not acceptable to exhaust heated air into the facility. At higher power levels, a separate exhaust system for heated air may also be inadequate to prevent overheating of components. A common alternative is to blow heated air in a recirculating air flow loop through an air-to-liquid heat exchanger, which transfers the heat from flowing air to a flowing heat transfer liquid, e.g. water. The heat is then carried away in the flowing liquid, and the cooled air is returned to be blown again over the heat-generating components.

Recirculating systems using heat exchangers usually require ducting to route the air through a heat exchanger instead of around it. However, if the components to be cooled involve multiple ventilation grilles and openings, it is difficult to design a duct that will seal around every opening, especially with multiple components. Additionally, water cooling adjacent to high voltage equipment often carries a risk of water leakage onto high voltage components, leading to short circuit, catastrophic equipment breakdown, and electric shock hazards. This is of particular concern if the equipment requires periodic access, disassembly, and/or reassembly for maintenance and/or component replacement, involving disconnecting and reconnecting water lines.

FIG. 1 is an isometric view of a conventional forced air cooled electronic enclosure 102 for laser or other equipment. In a typical recirculating air cooled system, a heat exchanger 104 is mounted inside a duct 106. The interface between duct 106 and heat exchanger 104 is gasketed, and duct 106 is configured to direct a recirculating air flow 108 entirely through heat exchanger 104, such that recirculating air flow 108 does not bypass heat exchanger 104. Typically a blower 110 is also mounted in flow series with heat exchanger 104 inside of duct 106 to propel recirculating air flow 108 through duct 106 and heat exchanger 104. An air inlet 112 and an air outlet 114 of duct 106 are connected to enclosure 102, forcing recirculating air flow 108 through the interior of enclosure 102.

Enclosure 102 typically contains heat-generating components (not shown). If these components are not cooled, temperature will build up in the interior of enclosure 102, leading to performance degradation or component failure. In the arrangement of FIG. 1, heat from heat-generating components within enclosure 102 is transferred to recirculating air flow 108, which in turn delivers the heat to heat exchanger 104. Typically heat exchanger 104 has a conventional finned tube structure, facilitating heat transfer from recirculating air flow 108 to water or other liquid coolant flowing through the tubes of heat exchanger 104. Heated recirculating air flow 108 enters heat exchanger 104 through air inlet 112 and duct 106, and cooled recirculating air flow 108 exits heat exchanger 104 and enters enclosure 102 through duct 106 and air outlet 114. Cool water or other liquid coolant enters heat exchanger 104 through a water inlet 116, and heated water or other heat transfer liquid exits heat exchanger 104 through a water outlet 118. For efficient cooling, it is important for air inlet 112 and air outlet 114 to be located such that recirculating air flow 108 passes over all heat-generating components within enclosure 102.

Particularly in industrial applications, it is important to minimize the manufacturing space occupied by electronic equipment. Thus it is important that such equipment be as compact as possible. Additionally, such manufacturing equipment typically requires periodic maintenance or component replacement. For required maintenance and/or component replacements, it is important to minimize the equipment down-time. Therefore it is desirable to facilitate access to internal components in a compact and often congested configuration with minimal disassembly and reassembly. In accordance with the conventional art, this often requires a design compromise between compactness and access. Complex and bulky cooling ducts consume valuable manufacturing floor space and often interfere with access to equipment components.

Needed in the art is a compact heat transfer method that provides cooling for multiple components without bulky or complicated ducting, and that permits easy access for maintenance and component replacement. Further needed in the art is a heat transfer method that allows water cooling of high voltage power equipment without danger of water leakage onto high voltage components and with minimal cost and complexity.

SUMMARY

In accordance with embodiments of the present invention, waste heat is removed from an equipment enclosure using a substantially recirculating air flow loop that is confined entirely within the enclosure. A segment of an air flow loop is directed onto heat-generating components, which transfer heat to the air flow. Another segment of the air flow loop carries the heated air to a heat exchanger, which typically transfers the heat in a conventional fashion from the heated air flow to flowing water or other flowing heat transfer liquid. Thus cooled, the air flow loop is redirected into the original segment and again impinges on and cools the heat-generating components.

The heat-generating components are typically contained within one or more housings mounted inside the enclosure. These housings normally have two or more openings to provide for inlet and exit of the air flow. In some embodiments, one or more blowers are mounted to a housing adjacent to an opening. In some embodiments, one or more blowers are self-contained inside a housing. In some embodiments, one or more blowers are externally mounted to a housing. In other embodiments, a heat exchanger is mounted directly across an opening. In some of these embodiments, one or more blowers are mounted to the face of the heat exchanger opposite the housing. Alternatively, in some embodiments, a blower is mounted to a housing, and a heat exchanger is mounted to the face of the blower opposite the housing.

At least a portion of the air flow loop traverses through the ductless air volume confined between the housings and inner walls of the enclosure. In some embodiments, one or more baffles mounted inside the enclosure are used to facilitate recirculation of the air flow. The enclosure air volume acts effectively as a mixing plenum, i.e., some mixing occurs between the air flow exiting a housing and the air volume. Similarly, some mixing occurs between the air volume and recirculating air at the inlet of a housing. Typically an inlet air flow captures at least a portion of the corresponding exit air flow. In embodiments providing direct mounting of a heat exchanger to a housing, for example, substantially all of the same air flow passes through the heat exchanger and onto the components within the housing. Generally, the net result of the mixing is to maintain the enclosure air volume at an equilibrium temperature, without degrading the performance of the cooling system.

In some embodiments, either commercially available or custom built water-cooled finned tube heat exchangers are employed, although heat exchangers of other types are also applicable. A wide variety of commercially available blowers are also applicable.

The equipment cooled in accordance with the described embodiments includes electronic equipment, particularly equipment associated with a laser, more particularly an excimer laser, such as a KrF or ArF laser. Embodiments of the present invention enable a single heat exchanger or multiple heat exchangers to cool multiple electronic components without complicated ducting and without exhausting heated air into a controlled manufacturing environment, e.g. a clean room. The simplified, compact cooling configuration of the embodiments conserves valuable floor space and costs, and facilitates access to components for periodic maintenance. In some embodiments, a water cooled heat exchanger is physically separated from heat-generating components, thereby preventing short circuits and shock hazards from water leakage onto high voltage devices.

BRIEF DESCRIPTION OF THE DRAWINGS

The present invention may be better understood, and its numerous objects, features, and advantages made apparent to those skilled in the art by referencing the accompanying drawings. For simplicity and ease of understanding, common numbering of elements within the illustrations is employed where an element is the same in different drawings.

DETAILED DESCRIPTION

The following is a detailed description of illustrative embodiments of the present invention. As these embodiments of the present invention are described with reference to the aforementioned drawings, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings are not to be considered in a limiting sense as it is understood that the present invention is in no way limited to the embodiments illustrated.

Figure 1:
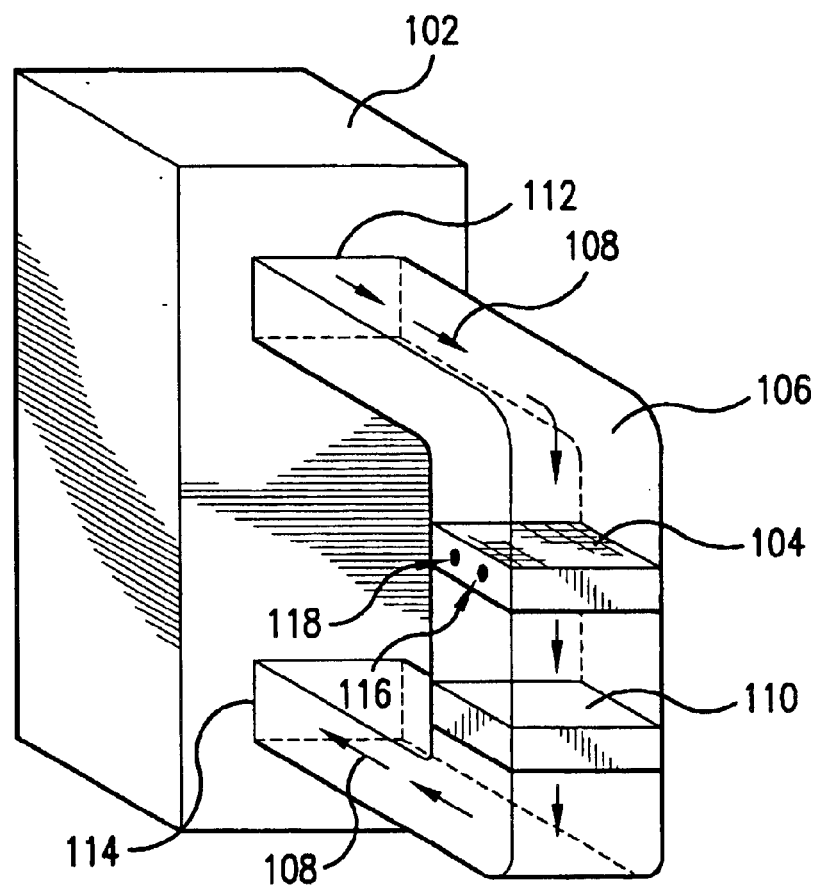
FIG. 1 is an isometric view of a conventional forced air cooled electronic enclosure for laser or other equipment.
Figure 2:
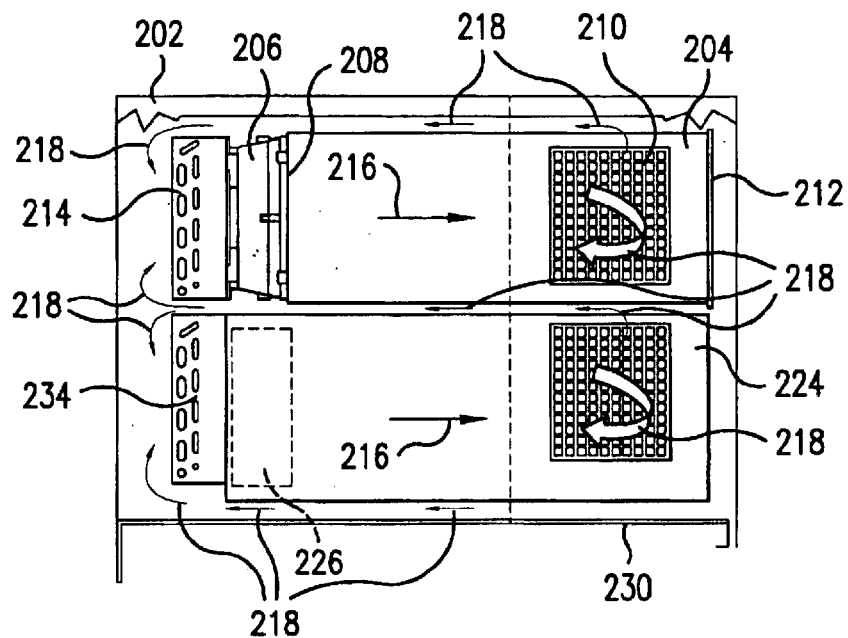
FIG. 2 is a schematic view of an electronic enclosure incorporating ductless cooling with a heat exchanger, in accordance with an embodiment of the invention.

FIG. 2 is a schematic view of an electronic enclosure 202 internally containing at least one electronic housing 204. Housing 204 contains internal heat-generating components (not shown). Typically, at least one conventional blower 206 is mounted to a wall (for convenience the back wall 208) of housing 204. An opening or grille (not shown) is provided through back wall 208 of housing 204 facing blower 206. At least one additional opening or grille (e.g. grille 210) is provided through a wall of housing 204 at or proximate to the front end 212 of housing 204.

A conventional heat exchanger 214 is mounted adjacent to blower 206. To prevent unwanted air leakage, conventional gasketing (not shown) is used at the interfaces of blower 206 with housing 204 and with heat exchanger 214. In some embodiments, blower 206 is oriented to draw an air flow 216 through heat exchanger 214 and to blow air flow 216 into housing 204, where air flow 216 is heated by heat-generating components. Heated exhaust air flow 218 exits housing 204 through grille 210 into the interior of enclosure 202. Exhaust air flow 218 then returns via the spaces formed between the various outer walls of housing 204 and the inner walls of enclosure 202 to the air intake of heat exchanger 214, whereupon the above described air recirculation cycle is repeated. Heat exchanger 214 cools air flow 216 in a conventional fashion, prior to air flow 216 reentering housing 204. Thus, compact ductless recirculating cooling with a heat exchanger is achieved.

In some embodiments, multiple electronic housings are contained within a single electronic enclosure. For example, a second electronic housing 224 is shown below housing 204 in FIG. 2. The cooling configuration for housing 224 is substantially identical and parallel to that for housing 204, except that the blower or blowers 226 for housing 224 are mounted internally to housing 224. In some embodiments housing 224 is, for example, a vendor supplied electronic module having self contained blowers 226. If required, a heat exchanger 234 is configured to interface with blowers 226. In some embodiments, an optional panel 230 isolates air flow in the upper portion of enclosure 202 from other portions of enclosure 202.

Although housing 224 is shown adjacent and parallel to housing 204, it will be recognized by those having ordinary skill in the art that housings 204 and 224 can be mutually positioned and oriented in any relationship, without departing from the scope and spirit of the present invention. Similarly, electronic enclosures containing more than two electronic housings as well as housings having multiple air outlets are encompassed by the embodiments of the invention.

Figure 3:
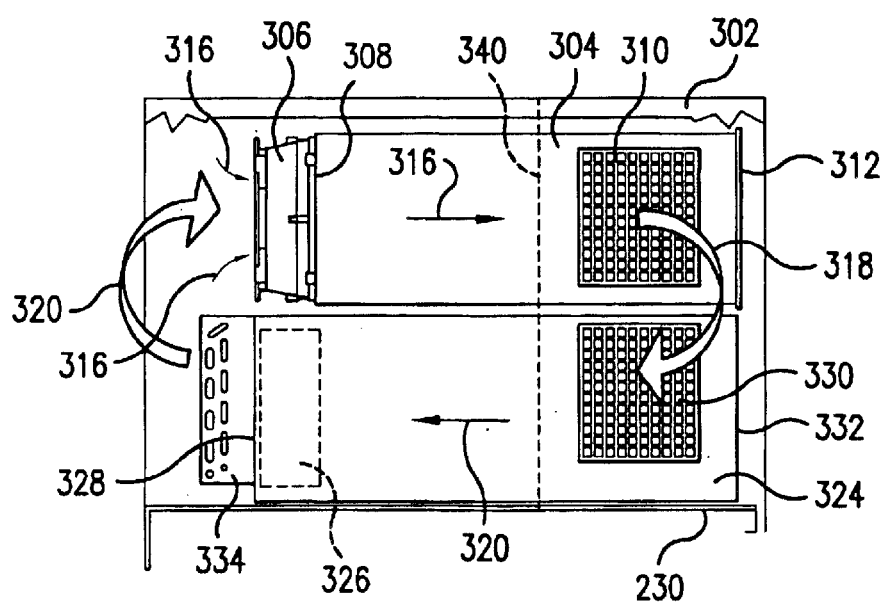
FIG. 3 is a schematic view of an electronic enclosure containing two electronic housings and incorporating anti-parallel air flow for ductless cooling with a heat exchanger.

FIG. 3 is a schematic view of an electronic enclosure 302 containing two electronic housings 304 and 324 having mutually antiparallel air flow configurations. By way of example, electronic housing 324 has self-contained blowers 326 and an attached heat exchanger 334 at back wall 328, whereas housing 304 has an attached blower (or multiple blowers) 306 at back wall 308 but has no heat exchanger. Housings 304 and 324 have air flow grilles 310 and 330 located respectively proximate to their front walls 312 and 332.

Blowers 306 are configured to draw air flow 316 from the air volume inside enclosure 302 but outside of housings 304 and 324, and to blow air flow 316 into housing 304. Air flow 316 is heated by heat-generating components (not shown) internal to housing 304, and heated exhaust air flow 318 exits housing 304 through grille 310 proximate to grille 330 into the air volume inside enclosure 302 but outside of housings 304 and 324.

Blowers 326 are configured to draw air flow 320 from the air volume inside enclosure 302 but outside of housings 304 and 324, through grille 330 (proximate to grille 310) and through the interior of housing 324, where air flow 320 is heated by heat-generating components (not shown) contained inside housing 324. Blowers 326 blow heated air flow 320 through heat exchanger 334, which cools air flow 320 in a conventional manner. Cooled air flow 320 then exits into the air volume inside enclosure 302 and proximate to the intake of blowers 306 but outside of housings 304 and 324.

Housings 304 and 324 together with the air volume inside enclosure 302 but outside of housings 304 and 324 form a ductless quasi-serial air flow configuration. Because of the proximity between heat exchanger 334 and the intake of blowers 306, a substantial fraction but not all of air flow 316 is captured directly from cooled air flow 320. This fraction is enhanced by negative air pressure at the intake of blowers 306 relative to the air outlet of heat exchanger 334. Similarly, because of the proximity between grilles 310 and 330 and negative air pressure at grille 330 relative to grille 310, a substantial portion but not all of heated exhaust air flow 318 is directly captured into air flow 320.

In the ductless air recirculation process illustrated in FIG. 3, the air volume inside enclosure 302 but outside of housings 304 and 324 effectively acts as a partial mixing plenum. Some of heated air flow 318 and some of cooled air flow 320 are mixed into the air volume within enclosure 302. Likewise, some of intake air flow 316 and intake air flow 320 are drawn from the air volume within enclosure 302. The net effect of these air flow and heat additions and withdrawals is to maintain the enclosure air volume at an equilibrium temperature comparable to the average flowing air temperature.

Recirculating air continuously transfers heat from the heat-generating components and delivers it to the heat exchanger, which continuously removes the heat from the enclosure in the form of heated water or other heat transfer liquid. Thus, the cooling effectiveness of a ductless cooling configuration, such as that shown in FIG. 3, is comparable with that of a conventional but much bulkier and complex ducted cooling configuration. Additionally, the arrangement of FIG. 3 employs only a single heat exchanger to cool two electronic housings.

In some embodiments, optional baffles, for example baffle 340 (shown by a dashed line in FIG. 3), are included inside enclosure 302 to facilitate a serial flow of air, as described in Watson, et al., U.S. Pat. No. 5,748,656, issued May 5, 1998, incorporated herein by reference in its entirety.

Although FIG. 3 shows a heat exchanger 334 located adjacent to a blower 326 at the air outlet of a housing 324, it will be recognized by those having ordinary skill in the art that heat exchangers and blowers can be located at any position along the quasi-serial air flow path.

Figure 4:
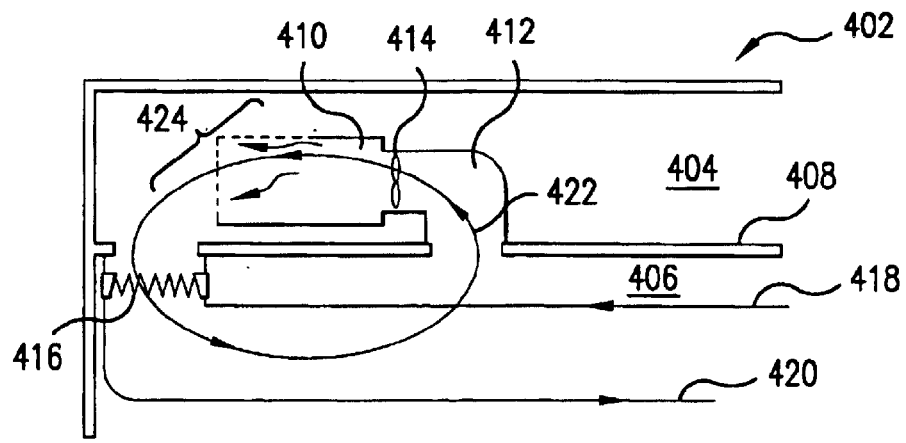
FIG. 4 is a schematic view of an electronic enclosure incorporating recirculating air flow cooling with a single section of duct.

In some embodiments of the present invention, cooling of electronic components is facilitated using a short section of duct connected with either the air inlet or outlet only, whichever is easier. FIG. 4 is a schematic view of an electronic enclosure 402 having two chambers 404 and 406 separated by a panel 408. An electronic housing 410 having heat-generating components (not shown) is contained in upper chamber 404. A duct 412 connected with an air inlet in electronic housing 410 provides a sealed air flow path from lower chamber 406 and contains a blower 414. Housing 410 includes multiple ventilation holes 424. There is only a single duct 412 in the air flow path. A conventional heat exchanger 416 covers an opening in panel 408 and is conventionally gasketed so that the only air flow path between upper chamber 404 and lower chamber 406 passes through heat exchanger 416. Heat exchanger 416 is fitted with a conventional water inlet 418 and water outlet 420.

In operation blower 414 draws an air flow 422 from lower chamber 406 through duct 412 into the air inlet of housing 410. Air flow 422 is heated by heat-generating components contained in housing 410. Heated air exits from housing 410 through multiple ventilation holes 424, all of which discharge heated air into upper chamber 404, thereby creating a positive air pressure in upper chamber 404 relative to lower chamber 406. This air pressure differential drives heated air flow from upper chamber 404 into lower chamber 406 through heat exchanger 416. Heat is transferred in heat exchanger 416, heating water flowing toward water outlet 420 relative to water flowing from water inlet 418.

The cooling configuration described in connection with FIG. 4 enables selective cooling in a desired housing using a single duct, even when the housing contains multiple ventilation holes. In other embodiments, blower 414 is reversed such air flow 422 is drawn into housing 410 through multiple ventilation holes 424 and heated air flow 422 is exhausted into lower chamber 406 through duct 412, thereby pressurizing air in lower chamber 406 relative to upper chamber 404. The differential air pressure then drives air flow 422 from lower chamber 406 into upper chamber 404 through heat exchanger 416, where air flow 422 is cooled, thereby providing a supply of cool air to be drawn into housing 410 through multiple ventilation holes 424. Those having ordinary skill in the art will recognize that, with air flow 422 in either direction, heat exchanger 416 can be moved from the position illustrated in FIG. 4 to a different position at either end of duct 412, without departing from the scope and spirit of the present invention. However, it is often advantageous to locate heat exchanger 416 and associated water lines in lower chamber 406 to facilitate access and to keep water remote from any high voltages in upper chamber 404.

Finned tube heat exchangers are commercially available in a variety of shapes and sizes from a number of suppliers, e.g. EG&G Wakefield Engineering, Components Division, 60 Audubon Road, Wakefield, Mass. 01880 (see Application Guide, Heat Exchanger Models). Alternatively, heat exchangers of many configurations can be custom designed and built by those having ordinary skill in the art.

Figure 5A:
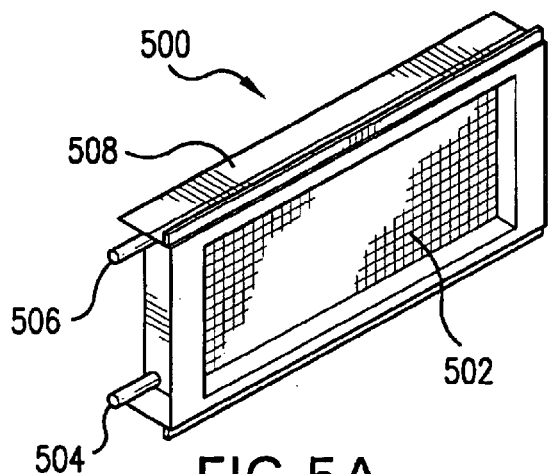
FIGS. 5A and 5B are isometric views illustrating two examples of custom designed heat exchangers.
Figure 5B:
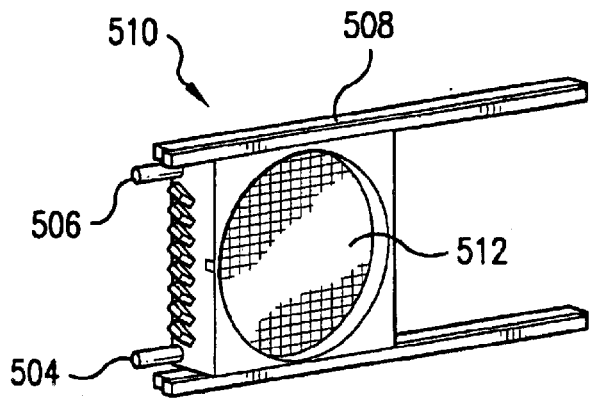

FIGS. 5A and 5B are isometric views illustrating two examples of custom designed heat exchangers. FIG. 5A shows a conventional heat exchanger 500 having a rectangular opening 502 through which air is blown or drawn. Opening 502 is densely covered with finned tubes (not shown), which are connected at their ends in a series or parallel water flow configuration to a water inlet 504 and a water outlet 506. Typically heat exchanger 500 has a support frame 508 around its perimeter, which includes for example brackets for mounting heat exchanger 500 to an electronic housing. In operation heated air enters opening 502 and flows over the finned tubes. Typically the heated air comes into intimate contact with the fins, which efficiently absorb heat from the air and conduct it to the water flowing inside of the tubes, thereby heating the water relative to the water temperature at water inlet 504. The heated water then carries the heat away from heat exchanger through water outlet 504.

FIG. 5B shows a conventional heat exchanger 510 having a circular opening 512, configured for example to interface with a blower. Other elements and method of operation of heat exchanger 510 are substantially the same as for heat exchanger 500. Likewise a wide variety of commercially available blowers are familiar in the art.

By way of example, the principles of the present invention have been applied to laser equipment for an ultraviolet (UV) excimer laser. In particular, an excimer laser produces UV laser radiation from excited noble gas halide molecules, e.g. KrF or ArF, in a pulsed gas discharge, as described in Das, et al., U.S. Pat. No. 5,377,215, issued Dec. 27, 1994, and Akins, et al., U.S. Pat. No. 4,959,840, issued Sep. 25, 1990. The laser equipment includes a discharge chamber, an AC power system, a high voltage power supply, and a commutator, some or all of which is distributed among two or more individual housings contained within an enclosure.

Referring to FIG. 2, a ductless cooling configuration for an excimer utilizes existing self contained blowers installed at the rear of, e.g. commutator and/or power supply housings contained in an enclosure 202. A power supply housing 204 has a single blower 206 with a capacity of 376 CFM (cubic feet per minute). A commutator housing 224 has two parallel blowers 226, each having a capacity of 300 CFM. Heat exchangers 214 and 234 are mounted adjacent to respective blowers 206 and 226 of power supply housing 204 and commutator housing 224, such that respective blowers 206, 226 draw inlet air from the enclosure air volume only through heat exchangers 214, 234, and thus blow only cooled air 216 into respective housings 204, 224. This configuration provides maximum cooling to electronic components within the housings, thus optimizing performance. Heated exhaust air 218 emerges from the front, sides, and rear of the respective housings (represented by grilles 210 and 230) and is confined within enclosure 202, where it eventually returns to the inlets of respective heat exchangers 214, 234 through the narrow spaces between the respective housings and the inner walls of enclosure 202. Heat exchangers 214, 234 each add a thickness of 62.5 mm plus an additional 50 mm for air flow clearance behind respective housings 204, 224. A conventional heat exchanger with separate fans would require an added thickness of 137.5 mm. The depth of enclosure 202 allows only 125 mm for added equipment behind the housings. Thus, application of the principles of the invention permits a compact laser equipment cooling configuration. Additionally, the thin profile of the heat exchangers makes them easily removable from the side for maintenance and convenient access to the components inside the housings.

Embodiments of the present invention enable a single heat exchanger to cool multiple electronic components without complicated ducting and without exhausting heated air into a controlled manufacturing environment, e.g. a clean room. The simplified, compact cooling configuration of the embodiments reduces valuable floor space consumption and cost, and facilitates access to components for periodic maintenance. Heated air is cooled in a heat exchanger and is recirculated without ducting around a substantially closed air flow path inside an enclosure. In some embodiments, a water cooled heat exchanger is physically separated from heat-generating components, thereby preventing the leakage of water onto high voltage devices.

While embodiments of the present invention have been shown and described, it will be obvious to those skilled in the art that changes and modifications to these illustrative embodiments can be made without departing from the present invention in its broader aspects. Thus it will be evident that there are other embodiments of this invention which, while not expressly described above, are within the scope and spirit of the present invention. Therefore, it will be understood that the appended claims necessarily encompass all such changes and modifications as fall within the described invention's true scope and spirit; and further that this scope and spirit is not limited merely to the illustrative embodiments presented to demonstrate that scope and spirit.

What is claimed is:

1. An excimer laser system comprising:
   a first housing containing heat generating laser components, the first housing having a first opening and a second opening;
   at least one additional housing containing heat generating laser components, the at least one additional housing having a first opening and second opening, the first opening of the at least one additional housing being proximate the first opening of the first housing, the second opening of the at least one additional housing being proximate the second opening of the first housing;
   a first liquid cooled heat exchanger affixed to the first opening in the first housing;
   an enclosure encasing the first housing, the at least one additional housing, and the first liquid cooled heat exchanger;
   a first blower configured to force air from outside the housings but within the enclosure through the first housing and the first liquid cooled heat exchanger, the first blower mounted proximate the first opening in the first housing; and
   a second blower configured to force air from outside the housings but within the enclosure through the at least one additional housing, the second blower affixed to the first opening in the second housing,
   wherein the heat generating laser components within the housings are efficiently cooled without air ducts.

2. The excimer laser system of claim 1, wherein the second blower draws air in through the first opening of the at least one additional housing and out of the second opening of the at least one additional housing.

3. The excimer laser system of claim 2, wherein the first blower draws air in through the first opening of the first housing and out of the second opening of the first housing.

4. The excimer laser system of claim 2 wherein the first blower draws air in through the second opening of the first housing and out of the first opening of the first housing.

5. The excimer laser system of claim 2, further comprising a second liquid cooled heat exchanger mounted proximate the first opening in the at least one additional housing.

6. The excimer laser system of claim 1, wherein the excimer laser is selected from the group consisting of KrF excimer lasers and ArF excimer lasers.

7. The excimer laser system of claim 1, wherein the first liquid cooled heat exchanger has a finned tube structure.

8. An excimer laser system comprising:
   a first housing containing heat generating laser components, the first housing having at least two openings;
   a second housing containing heat generating laser components, the second housing having at least two openings;
   a first liquid cooled heat exchanger mounted proximate one of the openings in the first housing;

a second liquid cooled heat exchanger affixed to one of the openings in the second housing;

an enclosure encasing the first and second housings and the first and second liquid cooled heat exchangers;

a first blower configured to force air from outside the housings but within the enclosure through the first housing and the first liquid cooled heat exchanger, wherein said first cooled heat exchanger is affixed to said first blower; and a second blower configured to force air from outside the housings but within the enclosure through the second liquid cooled heat exchanger and the second housing, wherein the heat generating laser components within the first and second housings are efficiently cooled without air ducts.

9. The excimer laser system of claim 8, wherein the excimer laser is selected from the group consisting of KrF excimer lasers and ArF excimer lasers.

10. The excimer laser system of claim 8, wherein at least one of the liquid cooled heat exchangers has a finned tube structure.

11. The excimer laser system of claim 8, wherein the heat exchangers are not affixed to the enclosure.

12. A method of cooling a plurality of heat generating components of an excimer laser comprising:

enclosing a first set of heat generating components within a first housing, the first housing having a first opening and a second opening;

enclosing at least one additional set of heat generating components in at least one additional housing, the at least one additional housing having a first opening and a second opening;

affixing a first liquid cooled heat exchanger to the first opening in the first housing;

encasing the first housing, the at least one additional housing and the first liquid cooled heat exchanger in an enclosure, the first opening of the first housing being proximate the first opening of the at least one additional housing, the second opening of the first housing being proximate the second opening of the at least one additional housing;

with a first blower, forcing air from within the enclosure but external to the housings through the first housing and the first liquid cooled heat exchanger, the first blower mounted proximate to the first opening in the first housing; and with a second blower, forcing air from within the enclosure but external to the housings through the first opening of the at least one additional housing and out of the second opening of the at least one additional housing, wherein the heat generating components in the first housing and the at least one additional housing are efficiently cooled while maintaining air within the enclosure and outside the housings at a substantially equilibrium temperature.

13. The method of claim 12, wherein the first liquid cooled heat exchanger has a finned tube structure.

14. The method of claim 12, wherein forcing air with the first blower includes drawing air in through the first opening of the first housing and out of the second opening of the first housing.

15. The method of claim 12, wherein forcing air with the first blower includes drawing air in through the second opening of the first housing and out of the first opening of the first housing.

16. The method of claim 12, further comprising mounting a second liquid cooled heat exchanger proximate the first opening in the at least one additional housing.

17. The method of claim 12, wherein the excimer laser is selected from the group consisting of KrF excimer lasers and AxF excimer lasers.

18. The method of claim 12, further comprising:

mounting at least one baffle within the enclosure; and
directing at least partially redirecting at least a portion of the air in the enclosure through the at least one baffle.

* * * * *